United States Patent
Watanabe et al.

(10) Patent No.: US 8,797,678 B1
(45) Date of Patent: Aug. 5, 2014

(54) SPINDLE MOTOR AND DISK DRIVE APPARATUS

(71) Applicant: Nidec Corporation, Kyoto (JP)

(72) Inventors: Tsuchitsugu Watanabe, Kyoto (JP); Yoichi Sekii, Kyoto (JP)

(73) Assignee: Nidec Corporation, Kyoto (JP)

( * ) Notice: Subject to any disclaimer, the term of this patent is extended or adjusted under 35 U.S.C. 154(b) by 0 days.

(21) Appl. No.: 13/898,921

(22) Filed: May 21, 2013

Related U.S. Application Data

(60) Provisional application No. 61/781,234, filed on Mar. 14, 2013.

(51) Int. Cl.
  *G11B 17/08* (2006.01)
  *G11B 19/20* (2006.01)
  *H02K 5/167* (2006.01)

(52) U.S. Cl.
  CPC ............ *G11B 19/2036* (2013.01); *H02K 5/167* (2013.01)
  USPC ...................................................... 360/98.07

(58) Field of Classification Search
  USPC .......... 360/98.07, 99.04, 99.08; 310/90, 90.5; 384/100, 107, 118, 119, 130
  See application file for complete search history.

(56) References Cited

U.S. PATENT DOCUMENTS

| | | | |
|---|---|---|---|
| 5,533,811 | A | 7/1996 | Polch et al. |
| 5,558,443 | A | 9/1996 | Zang |
| 5,880,545 | A | 3/1999 | Takemura et al. |
| 6,211,592 | B1 | 4/2001 | Ichiyama |
| 6,246,136 | B1 | 6/2001 | Ichiyama |
| 6,991,376 | B2 | 1/2006 | Aiello et al. |
| 2004/0090702 | A1 | 5/2004 | Aiello et al. |
| 2004/0096131 | A1 | 5/2004 | Aiello et al. |
| 2004/0156568 | A1 | 8/2004 | Woldemar et al. |
| 2004/0165797 | A1 | 8/2004 | Oku et al. |
| 2004/0175062 | A1 | 9/2004 | Nishimura et al. |
| 2005/0031237 | A1 | 2/2005 | Gomyo et al. |
| 2005/0111769 | A1 | 5/2005 | Haga |
| 2005/0225187 | A1 | 10/2005 | Hafen et al. |

(Continued)

FOREIGN PATENT DOCUMENTS

| | | |
|---|---|---|
| JP | 06-28335 U | 4/1994 |
| JP | 06-121484 A | 4/1994 |

(Continued)

OTHER PUBLICATIONS

Kimura et al., "Dynamic Pressure Bearing and Spindle Motor Using the Same", U.S. Appl. No. 12/952,223, filed Nov. 23, 2010.

(Continued)

*Primary Examiner* — Joseph Feild
*Assistant Examiner* — Gustavo Polo
(74) *Attorney, Agent, or Firm* — Keating & Bennett, LLP

(57) ABSTRACT

In a spindle motor, a shaft portion includes a columnar portion, an annular portion, and a recessed portion. A cap portion includes a flat plate portion and a projecting portion. The recessed portion includes a first side surface and a second side surface arranged radially outside the first side surface. A lower end portion of the projecting portion is arranged inside the recessed portion. The first side surface is arranged opposite to an inner circumferential surface of the projecting portion with a first region intervening therebetween. The second side surface is arranged opposite to an outer circumferential surface of the projecting portion with a second region intervening therebetween. A bottom portion of the recessed portion is arranged opposite to the lower end portion of the projecting portion with a third region intervening therebetween.

18 Claims, 7 Drawing Sheets

(56) References Cited

U.S. PATENT DOCUMENTS

| | | | |
|---|---|---|---|
| 2006/0002638 A1 | 1/2006 | Ichiyama |
| 2006/0002641 A1 | 1/2006 | Ichiyama |
| 2006/0039634 A1 | 2/2006 | Ichiyama |
| 2006/0039636 A1 | 2/2006 | Ichiyama |
| 2006/0051001 A1 | 3/2006 | Nishimura et al. |
| 2006/0182374 A1 | 8/2006 | Schwamberger et al. |
| 2006/0210205 A1 | 9/2006 | Engesser et al. |
| 2006/0222276 A1 | 10/2006 | Uenosono |
| 2007/0030591 A1 | 2/2007 | Engesser et al. |
| 2007/0133911 A1 | 6/2007 | Nishimoto et al. |
| 2007/0140606 A1 | 6/2007 | Feng et al. |
| 2007/0154123 A1 | 7/2007 | Gomyo et al. |
| 2007/0177832 A1 | 8/2007 | Gotoh et al. |
| 2007/0211971 A1 | 9/2007 | Obara et al. |
| 2008/0006332 A1 | 1/2008 | Ishizawa et al. |
| 2008/0056104 A1 | 3/2008 | Nishimura et al. |
| 2008/0187257 A1 | 8/2008 | Engesser et al. |
| 2008/0292228 A1 | 11/2008 | Yamashita et al. |
| 2009/0129710 A1 | 5/2009 | Ito et al. |
| 2009/0140587 A1 | 6/2009 | Popov et al. |
| 2009/0140588 A1 | 6/2009 | Drautz et al. |
| 2009/0279818 A1 | 11/2009 | Le et al. |
| 2010/0124387 A1 | 5/2010 | Fuss et al. |
| 2010/0142869 A1 | 6/2010 | Grantz et al. |
| 2010/0266225 A1 | 10/2010 | Yamashita et al. |
| 2011/0192210 A1 | 8/2011 | Yamashita et al. |

FOREIGN PATENT DOCUMENTS

| | | | |
|---|---|---|---|
| JP | 07-336924 A | 12/1995 |
| JP | 2002-005171 A | 1/2002 |
| JP | 2003-056555 A | 2/2003 |
| JP | 2003-061295 A | 2/2003 |
| JP | 2003-092867 A | 3/2003 |
| JP | 2003-244886 A | 8/2003 |
| JP | 2004-173377 A | 6/2004 |
| JP | 2005-048890 A | 2/2005 |
| JP | 2006-226388 A | 8/2006 |
| JP | 2009-041671 A | 2/2009 |
| JP | 2009-133361 A | 6/2009 |
| JP | 2011-002024 A | 1/2011 |
| WO | 2006/120719 A1 | 11/2006 |

OTHER PUBLICATIONS

Kimura et al., "Bearing Apparatus, Spindle Motor, and Disk Drive Apparatus", U.S. Appl. No. 12/791,147, filed Jun. 1, 2010.
Oe et al., "Bearing Apparatus, Spindle Motor, and Disk Drive Apparatus", U.S. Appl. No. 12/793,851, filed Jun. 4, 2010.
Yamada et al., "Fluid Dynamic Bearing Apparatus Arranged to Discharge Air Bubbles Generated Therein and a Spindle Motor and Disk Drive Apparatus Including the Same", U.S. Appl. No. 12/742,931, filed May 14, 2010.
Yamada et al., "Fluid Dynamic Bearing Apparatus, Spindle Motor, and Disk Drive Apparatus", U.S. Appl. No. 12/899,658, filed Oct. 7, 2010.
Yamada et al., "Fluid Dynamic Bearing Apparatus, Spindle Motor, and Disk Drive Apparatus", U.S. Appl. No. 13/299,542, filed Nov. 18, 2011.
Kimura et al., "Bearing Apparatus, Spindle Motor, and Disk Drive Apparatus", U.S. Appl. No. 13/602,420, filed Sep. 4, 2012.
Kimura et al., "Bearing Apparatus, Spindle Motor, and Disk Drive Apparatus", U.S. Appl. No. 13/681,500, filed Nov. 20, 2012.
Iwasaki et al., "Motor and Disk Drive Apparatus", U.S. Appl. No. 13/613,109, filed Sep. 13, 2012.
Tamaoka et al., "Motor and Disk Drive Apparatus", U.S. Appl. No. 13/613,106, filed Sep. 13, 2012.
Iwasaki et al., "Motor and Disk Drive Apparatus", U.S. Appl. No. 13/613,108, filed Sep. 13, 2012.
Fukushima et al., "Motor and Disk Drive Apparatus", U.S. Appl. No. 13/751,380, filed Jan. 28, 2013.
Sekii et al., "Spindle Motor and Disk Drive Apparatus", U.S. Appl. No. 13/767,205, filed Feb. 14, 2013.
Sekii et al.; "Bearing Apparatus, Spindle Motor, and Disk Drive Apparatus", U.S. Appl. No. 13/790,089, filed Mar. 8, 2013.
Sato et al., "Spindle Motor and Disk Drive Apparatus", U.S. Appl. No. 13/798,857, filed Mar. 13, 2013.
Sekii et al., "Motor and Disk Drive Apparatus", U.S. Appl. No. 13/886,290, filed May 3, 2013.
Kimura et al., "Bearing Apparatus, Spindle Motor, and Disk Drive Apparatus", U.S. Appl. No. 13/602,348, filed Sep. 4, 2012.
Kimura et al., "Bearing Mechanism, Motor, and Disk Drive Apparatus", U.S. Appl. No. 13/775,475, filed Feb. 25, 2013.
Sumiji et al., "Bearing Mechanism, Motor, and Disk Drive Apparatus", U.S. Appl. No. 13/775,467, filed Feb. 25, 2013.
Sumiji et al., "Bearing Mechanism, Motor, and Disk Drive Apparatus", U.S. Appl. No. 13/785,297, filed Mar. 5, 2013.
Mizukami et al., "Spindle Motor Including Fluid Bearing and Storage Disk Drive Including the Same", U.S. Appl. No. 13/198,794, filed Aug. 5, 2011.
Mizukami et al., "Spindle Motor and Storage Disk Drive", U.S. Appl. No. 13/739,402, filed Jan. 11, 2013.
Mizukami et al., "Spindle Motor and Storage Disk Drive", U.S. Appl. No. 13/739,415, filed Jan. 11, 2013.
Yamamoto et al., "Spindle Motor and Storage Disk Drive", U.S. Appl. No. 13/353,563, filed Jan. 19, 2012.
Mizukami et al., "Spindle Motor Having Dynamic Pressure Fluid for Use in a Storage Disk Drive", U.S. Appl. No. 13/198,793, filed Aug. 5, 2011.
Yamaguchi et al., "Method of Manufacturing Fluid Dynamic Bearing Mechanism, Motor, and Storage Disk Drive", U.S. Appl. No. 13/353,554, filed Jan. 19, 2012.
Mizukami et al., "Spindle Motor and Storage Disk Drive", U.S. Appl. No. 13/198,776, filed Aug. 5, 2011.
Mizukami et al., "Spindle Motor and Storage Disk Drive", U.S. Appl. No. 13/198,784, filed Aug. 5, 2011.
Mizukami et al., "Spindle Motor and Storage Disk Drive", U.S. Appl. No. 13/198,787, filed Aug. 5, 2011.
Tamaoka et al., "Spindle Motor and Storage Disk Drive", U.S. Appl. No. 13/353,557, filed Jan. 19, 2012.
Mizukami et al., "Spindle Motor and Storage Disk Drive", U.S. Appl. No. 13/198,797, filed Aug. 5, 2011.
Mizukami et al., "Motor and Storage Disk Drive,", Chinese Patent Application No. 20120021666.6, filed Jan. 31, 2012.
English Translation of Official Communication issued in International Patent Application No. PCT/JP2009/059556, mailed on Jan. 20, 2011.

_(1)_

SPINDLE MOTOR AND DISK DRIVE APPARATUS

BACKGROUND OF THE INVENTION

1. Field of the Invention

The present invention relates to a spindle motor preferably for use in a disk drive apparatus, for example.

2. Description of the Related Art

Some known motors used in disk drive apparatuses include a bearing mechanism using fluid dynamic pressure. For example, a spindle motor disclosed in JP 2009-136143A includes a fixed shaft, an annular bearing component, a rotor component, and an annular cover. The bearing component is arranged at an upper end portion of the fixed shaft. The bearing component is defined integrally with the fixed shaft. The rotor component is arranged outside the fixed shaft. The annular cover is arranged above the bearing component. A radially outer end portion of the annular cover is adhered to an upper end portion of the rotor component. An outer circumferential surface of the bearing component is arranged opposite to an inner circumferential surface of the upper end portion of the rotor component. A seal gap is defined between the outer circumferential surface of the bearing component and the inner circumferential surface of the upper end portion of the rotor component. The seal gap is covered with the annular cover.

As described in JP 2009-136143A, in some motors, a cap member arranged to cover a seal gap is arranged in a rotating portion. In such a motor, the annular cover is arranged to define a labyrinth seal together with an end portion of the shaft, and this reduces exchange of air and accompanying evaporation of a bearing fluid. However, since a gap is defined between the rotating portion and a stationary portion, air including a vaporized lubricating oil leaks out of the motor through this gap. Moreover, an attempt to secure a sufficient rigidity of the cap member by increasing the thickness thereof would prevent a reduction in the thickness of the motor. A reduced thickness of the cap member results in a reduced axial dimension of a gap of the labyrinth seal, leading to increased evaporation of the lubricating oil. Accordingly, there is a demand for a structure which secures a sufficient length of the labyrinth seal while achieving a reduction in the thickness of the motor.

SUMMARY OF THE INVENTION

A spindle motor according to a first exemplary preferred embodiment of the present invention includes a stationary portion and a rotating portion. The stationary portion includes a shaft portion. The rotating portion includes a rotor magnet, and is rotatably supported by the stationary portion through a lubricating oil. The shaft portion includes a columnar portion, an annular portion, and a recessed portion. The columnar portion is arranged along a central axis extending in a vertical direction. The annular portion is arranged to extend radially outward from the columnar portion. The recessed portion is annular, and is arranged to be recessed downward. The rotating portion includes a sleeve portion, a tubular portion, and a cap portion. The sleeve portion is arranged opposite to the shaft portion. The tubular portion is arranged to extend upward from a position radially outward of a gap between the shaft portion and the sleeve portion, and is arranged opposite to the shaft portion. The cap portion is arranged near a top portion of the tubular portion. The cap portion includes a flat plate portion and a projecting portion. The flat plate portion is arranged to extend radially. The projecting portion is arranged radially inside the flat plate portion, and is arranged to project downward. The lubricating oil is arranged in the gap between the shaft portion and the sleeve portion. The gap is arranged to be in communication with an upper seal portion defined between the annular portion and the tubular portion, and a liquid surface of the lubricating oil is located in the upper seal portion. The recessed portion includes a first side surface and a second side surface. The second side surface is arranged radially outside the first side surface. A lower end portion of the projecting portion is arranged inside the recessed portion. The first side surface is arranged opposite to an inner circumferential surface of the projecting portion with a first region intervening therebetween. The second side surface is arranged opposite to an outer circumferential surface of the projecting portion with a second region intervening therebetween. A bottom portion of the recessed portion is arranged opposite to the lower end portion of the projecting portion with a third region intervening therebetween. An average distance between the first side surface and the inner circumferential surface of the projecting portion is preferably shorter than an average distance between the second side surface and the outer circumferential surface of the projecting portion and shorter than an average distance between the bottom portion of the recessed portion and the lower end portion of the projecting portion. Thus, a reduction in evaporation of the lubricating oil is achieved.

The above and other elements, features, steps, characteristics, and advantages of the present invention will become more apparent from the following detailed description of the preferred embodiments with reference to the attached drawings.

DETAILED DESCRIPTION OF THE PREFERRED EMBODIMENTS

It is assumed herein that an upper side and a lower side along a central axis of a motor are referred to simply as an upper side and a lower side, respectively. It should be noted, however, that the above definitions of the upper and lower sides are not meant to indicate relative positions or directions of different members or portions when actually installed in a device. Also note that a direction parallel to or substantially parallel to the central axis is referred to by the term "axial direction", "axial", or "axially", that radial directions centered on the central axis are simply referred to by the term "radial direction", "radial", or "radially", and that a circumferential direction about the central axis is simply referred to by the term "circumferential direction", "circumferential", or "circumferentially".

Figure 1:
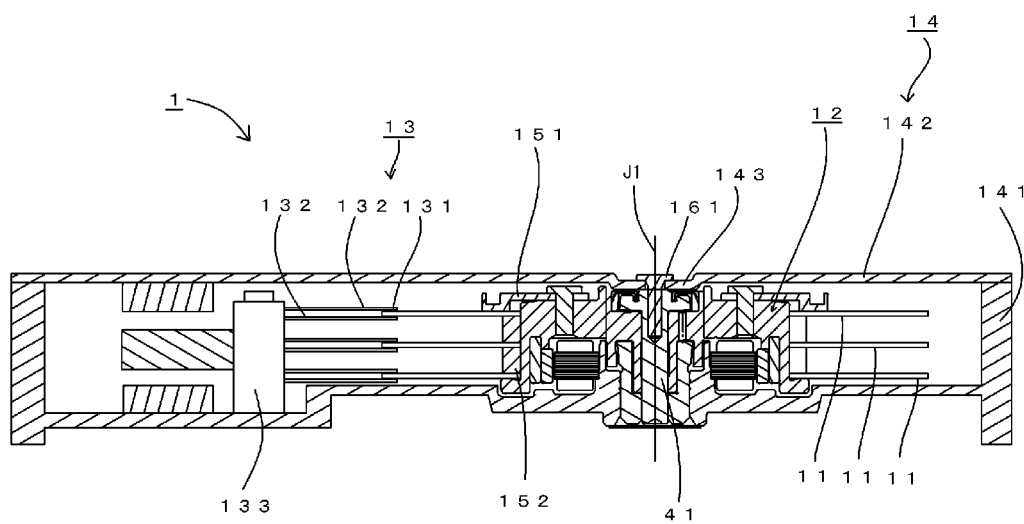
FIG. 1 is a vertical cross-sectional view of a disk drive apparatus according to a preferred embodiment of the present invention.

FIG. 1 is a vertical cross-sectional view of a disk drive apparatus 1 including a spindle motor (hereinafter referred to simply as a "motor") according to a preferred embodiment of the present invention. The disk drive apparatus 1 is preferably a so-called hard disk drive. The disk drive apparatus 1 preferably includes, for example, three disks 11, a motor 12, an access portion 13, and a housing 14. The motor 12 is arranged to rotate the disks 11, on which information is recorded. The access portion 13 is arranged to perform reading and writing of information from or to the disks 11. The access portion 13 may be arranged to perform at least one of the reading and the writing of information from or to the disks 11.

The housing 14 preferably includes a substantially cup-shaped lower housing member 141 and a substantially flat plate-shaped upper plate member 142. The disks 11, the motor 12, and the access portion 13 are arranged inside the lower housing member 141. The upper plate member 142 is fitted to the lower housing member 141 to define the housing 14. An interior space of the disk drive apparatus 1 is preferably a clean space with extremely little or no dirt or dust. In the present preferred embodiment, the interior space of the disk drive apparatus 1 is preferably filled with an air. Note that the interior space of the disk drive apparatus 1 may alternatively be filled with a helium gas, a hydrogen gas, etc. if so desired. Also note that the interior space of the disk drive apparatus 1 may be filled with a mixture of either or both of these gases and an air.

The three disks 11 are preferably fixed to a rotor hub of the motor 12 through, for example, a clamper 151 and spacers 152 such that the disks 11 are arranged at regular intervals along a central axis J1 of the motor 12. The access portion 13 preferably includes six heads 131, six arms 132, and a head actuator mechanism 133, for example. Each of the heads 131 is arranged in close proximity to one of the disks 11 to read and write information from or to the disk 11. Note that the head 131 may be arranged to perform at least one of the reading and the writing of information. Each of the arms 132 is arranged to support one of the heads 131. The head actuator mechanism 133 is arranged to move each of the arms 132 to move an associated one of the heads 131 relative to an associated one of the disks 11. The head actuator mechanism 133 enables the head 131 to access a desired location on the disk 11 with the head 131 being arranged in close proximity to the rotating disk 11. Note that the number of disks 11 is not limited to three, but may be one or more than one, for example.

Figure 2:
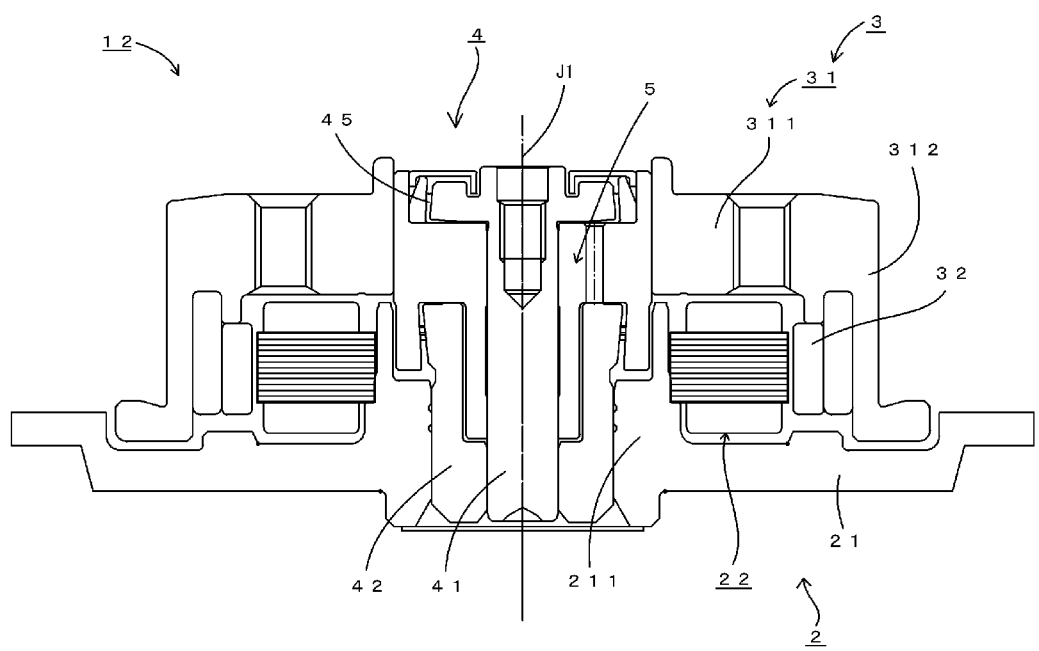
FIG. 2 is a vertical cross-sectional view of a spindle motor according to a preferred embodiment of the present invention.

FIG. 2 is a vertical cross-sectional view of the spindle motor according to a preferred embodiment of the present invention. The motor 12 preferably is an outer-rotor motor, for example. The motor 12 includes a stationary portion 2 and a rotating portion 3. In FIG. 2, a fluid dynamic bearing mechanism (hereinafter referred to as a "bearing mechanism") defined by a portion of the stationary portion 2 and a portion of the rotating portion 3 is denoted by reference numeral "4". The rotating portion 3 is supported through a lubricating oil 45 to be rotatable about the central axis J1 of the motor 12 with respect to the stationary portion 2.

The stationary portion 2 preferably includes a base plate 21, which is preferably a base portion, a stator 22, a shaft portion 41, and a lower thrust portion 42. The base plate and the lower housing member 141 illustrated in FIG. 1 are preferably defined by a single monolithic member and define a portion of the housing 14. The stator 22 is fixed to a circumference of a cylindrical holder 211 of the base plate 21. A hole portion is defined inside the holder 211. Note that the base plate 21 and the lower housing member 141 may be defined by separate members. The shaft portion 41 preferably includes a screw hole in an upper portion thereof. A central portion 143 of the upper plate member 142 illustrated in FIG. 1 is recessed downward. Hereinafter, the central portion 143 will be referred to as a "plate central portion 143". A screw 161 is preferably inserted into a through hole of the plate central portion 143 and the screw hole of the shaft portion 41. The plate central portion 143 and the shaft portion 41 are thereby fixed to each other. A lower surface of the plate central portion 143 is arranged to be in contact with an upper surface of the shaft portion 41. Thus, the upper plate member 142 is securely fixed to the motor 12.

As illustrated in FIG. 2, the rotating portion 3 includes a rotor hub 31 and a rotor magnet 32. The rotor hub 31 preferably includes a cylindrical or substantially cylindrical sleeve portion 5 arranged opposite to the shaft portion 41, a cover portion 311, and a cylindrical portion 312. The cover portion 311 is arranged to extend radially outward from an upper portion of the sleeve portion 5. The cylindrical portion 312 is arranged to extend downward from an outer edge portion of the cover portion 311. The rotor magnet 32 is fixed inside the cylindrical portion 312. The rotor magnet 32 is arranged radially opposite the stator 22. A torque is preferably produced between the stator 22 and the rotor magnet 32. Note that the sleeve portion 5 may alternatively be defined by a member separate from the cover portion 311 and the cylindrical portion 312. In this case, the sleeve portion 5 is preferably fixed to the cover portion 311.

Figure 3:
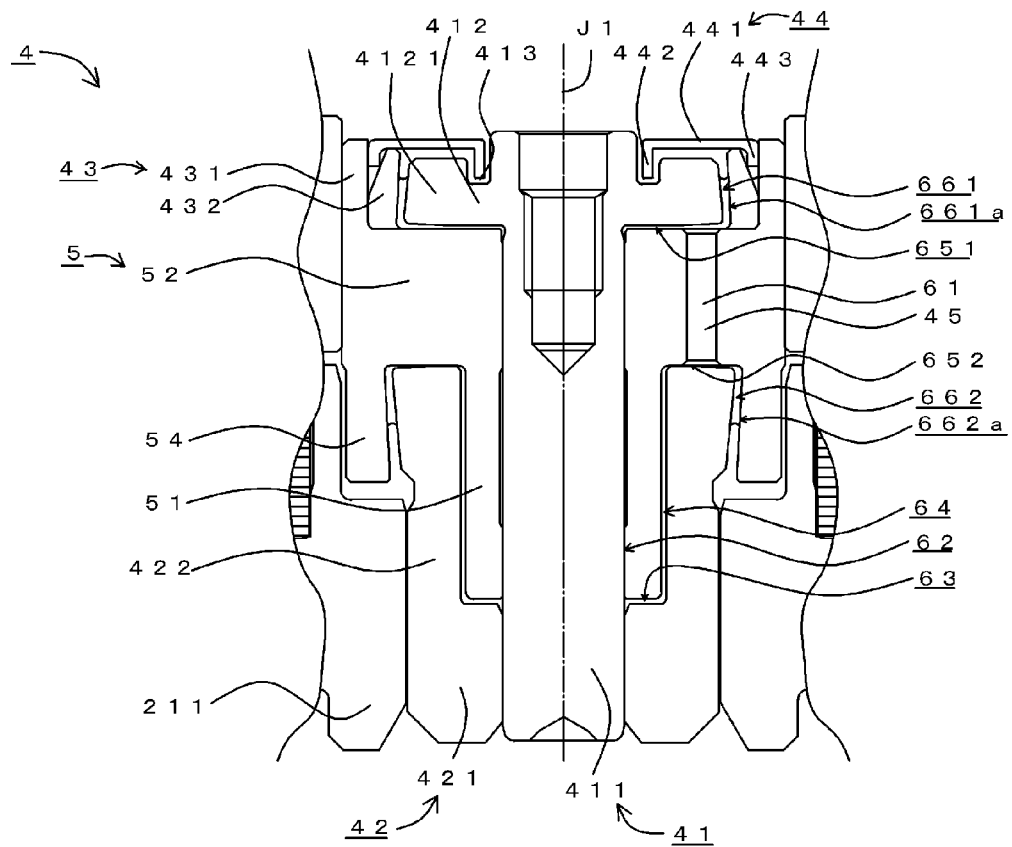
FIG. 3 is a vertical cross-sectional view of a bearing mechanism according to a preferred embodiment of the present invention.

FIG. 3 illustrates the bearing mechanism 4 in an enlarged form. The bearing mechanism 4 preferably includes the shaft portion 41, the lower thrust portion 42, the sleeve portion 5, the tubular portion 43, a lower hub tubular portion 54, and the lubricating oil 45. As described above, each of the shaft portion 41 and the lower thrust portion 42 is preferably a portion of the stationary portion 2. Each of the sleeve portion 5, the tubular portion 43, and a cap portion 44 is preferably a portion of the rotating portion 3. The shaft portion 41 is preferably, for example, press fitted and fixed in a hole portion defined inside the lower thrust portion 42. The shaft portion 41 preferably includes a columnar portion 411, an annular portion 412, and a recessed portion 413. The columnar portion 411 is arranged along the central axis J1, which extends in a vertical direction. The annular portion 412 is arranged to extend radially outward from the columnar portion 411. In addition, the annular portion 412 preferably includes an annular raised portion 4121 arranged radially outward of the recessed portion 413. The recessed portion 413 is recessed downward, and is annular in shape. In the present preferred embodiment, the columnar portion 411 and the annular portion 412 are preferably defined by a single monolithic member. Note that the columnar portion 411 and the annular portion 412 may alternatively be defined by separate members if so desired.

The lower thrust portion 42 preferably includes a lower plate portion 421 and an outer tubular portion 422. The lower thrust portion 42 is made of, for example, copper, high-strength brass, or the like. The lower plate portion 421 is arranged to extend radially outward from a lower portion of the columnar portion 411. The outer tubular portion 422 is arranged to extend upward from an outer edge portion of the lower plate portion 421. An upper portion of an outer circumferential surface of the outer tubular portion 422 includes an inclined surface which is angled radially inward with decreasing height.

When the motor 12 is assembled, a lower portion of the outer circumferential surface of the outer tubular portion 422 is preferably fixed to an inner circumferential surface of the holder 211 of the base plate 21 through, for example, an adhesive. Therefore, axial positioning of the outer tubular portion 422 with respect to the base plate 21 is accomplished more precisely, resulting in improved accuracy of the height of the motor 12, than in the case where the fixing is accomplished by press fitting. Note that the lower portion of the outer circumferential surface of the outer tubular portion 422 may be fixed to the inner circumferential surface of the holder 211 of the base plate 21 through press fitting.

The sleeve portion 5 preferably includes an inner tubular portion 51 and a flange portion 52. The sleeve portion 5 is preferably made of, for example, stainless steel, aluminum, copper, or the like. The inner tubular portion 51 is arranged in a cylindrical or substantially cylindrical space defined between the outer tubular portion 422 and the columnar portion 411. The flange portion 52 is arranged to project radially outward from an upper portion of the inner tubular portion 51. The axial thickness of the flange portion 52 is preferably half or less than half the axial dimension of an inner circumferential surface of the inner tubular portion 51. An upper surface and a lower surface of the flange portion 52 are preferably arranged to be perpendicular or substantially perpendicular to the central axis J1. The flange portion 52 preferably includes a communicating hole 61 arranged to pass through the flange portion 52 in the vertical direction. In the present preferred embodiment, the number of communicating holes 61 is preferably one, for example. However, two or more communicating holes 61 may be provided.

The tubular portion 43 is arranged to extend upward from a position radially outward of a gap between the shaft portion 41 and the sleeve portion 5 to assume a cylindrical or substantially cylindrical shape. More specifically, the tubular portion 43 is arranged to extend upward from a position radially outward of a gap between a lower surface of the annular portion 412 and the upper surface of the flange portion 52. The tubular portion 43 preferably includes a tubular projecting portion 431 and an upper tubular portion 432. The tubular projecting portion 431 is arranged in an outer circumferential portion of the tubular portion 43. An inner circumferential surface of the tubular projecting portion 431 and an outer circumferential surface of the cap portion 44 are mated with and thus fixed to each other. The upper tubular portion 432 is arranged radially inward of the tubular projecting portion 431, and is arranged opposite to an outer circumferential surface of the annular raised portion 4121. An inner circumferential surface of the upper tubular portion 432 preferably includes a portion which is angled radially inward with increasing height. Note that the tubular projecting portion 431 and the upper tubular portion 432 may alternatively be defined by a single monolithic member if so desired.

The lower hub tubular portion 54 is preferably arranged to extend downward from an outer edge portion of the flange portion 52 to assume a cylindrical shape. The lower hub tubular portion 54 is arranged radially outside the outer tubular portion 422 of the lower thrust portion 42. An inner circumferential surface of the lower hub tubular portion 54 includes a portion which is angled radially inward with decreasing height. Note that each of the tubular portion 43 and the lower hub tubular portion 54 may be defined by a member separate from the flange portion 52 or the cover portion 311.

The cap portion 44 is arranged near a top portion of the tubular portion 43. The cap portion 44 preferably includes a flat plate portion 441, a projecting portion 442, and a bent portion 443. The flat plate portion 441 is arranged to extend radially to assume an annular or a substantially annular shape. The projecting portion 442 is arranged radially inside the flat plate portion 441, and is arranged to project downward. The bent portion 443 is arranged radially outside the flat plate portion 441, and is arranged to project upward or downward. Note that the bent portion may be arranged to bend upward.

The rotating portion 3, which includes the sleeve portion 5, illustrated in FIG. 2 is arranged to rotate with respect to the shaft portion 41 and the lower thrust portion 42 with the lubricating oil 45 intervening therebetween when the motor 12 is running.

An outer circumferential surface of the columnar portion 411 is arranged radially opposite to an inner circumferential surface of the inner tubular portion 51 of the sleeve portion 5. A radial gap 62 is preferably defined between the columnar portion 411 and the inner tubular portion 51. The radial width of the radial gap 62 is preferably in the range of about 2 μm to about 4 μm, for example. As illustrated in FIG. 3, an axial gap 63 is preferably defined between a lower end of the inner tubular portion 51 and the lower plate portion 421. Hereinafter, the gap 63 will be referred to as a "lower end gap 63".

A gap 64 in the shape of a cylinder is preferably defined between an outer circumferential surface of the inner tubular portion 51 and an inner circumferential surface of the outer tubular portion 422. Hereinafter, the gap 64 will be referred to as a "cylindrical gap 64". As illustrated in FIG. 3, the cylindrical gap 64 is arranged to be in communication with the radial gap 62 through the lower end gap 63. The radial width of the cylindrical gap 64 is preferably greater than the radial width of the radial gap 62 and smaller than the diameter of the communicating hole 61.

As illustrated in FIG. 3, a gap 651 is preferably defined between a region of the upper surface of the flange portion 52 which is radially inward of the communicating hole 61 and the lower surface of the annular portion 412, which is arranged axially opposite the upper surface of the flange portion 52. Hereinafter, the gap 651 will be referred to as an "upper thrust gap 651". Meanwhile, a gap 652 is preferably defined between a region of the lower surface of the flange portion 52 which is radially inward of the communicating hole 61 and an upper surface of the outer tubular portion 422. Hereinafter, the gap 652 will be referred to as a "lower thrust gap 652". The communicating hole 61 is preferably arranged to connect the upper thrust gap 651 and the lower thrust gap 652 with each other. In the bearing mechanism 4, the radial gap 62, the lower end gap 63, the cylindrical gap 64, the upper and lower thrust gaps 651 and 652, and the communicating hole 61 are defined with the radial gap 62 located most radially inward and the others located progressively more radially outward in the order named.

The inner circumferential surface of the upper tubular portion 432 is arranged radially opposite the outer circumferential surface of the annular raised portion 4121. A gap 661 is preferably defined between the upper tubular portion 432 and the annular raised portion 4121. The upper thrust gap 651 is arranged to be in communication with the gap 661. The gap 661 is preferably arranged radially outward of the radial gap 62, the upper thrust gap 651, and the communicating hole 61. The gap 661 is arranged to gradually increase in width with increasing height, that is, toward an opening of the gap 661. Hereinafter, the gap 661 will be referred to as an "upper seal gap 661". In addition, the upper seal gap 661 is preferably angled toward the central axis J1 with increasing height. That is, the upper seal gap 661 is preferably angled to the left in FIG. 3. A liquid surface of the lubricating oil 45 is located in the upper seal gap 661. The lubricating oil 45 is held in the upper seal gap 661 through capillary action. An upper capillary seal portion 661a arranged to hold the lubricating oil 45 is thus preferably defined in the upper seal gap 661. The opening of the upper seal gap 661 is covered with the cap portion 44.

In the present preferred embodiment, at least one of the inner circumferential surface of the upper tubular portion 432 and the outer circumferential surface of the annular raised portion 4121 may preferably include a pumping action portion (not shown) arranged to induce an axially downward pressure on the lubricating oil 45. In addition, once the motor 12 is driven to rotate, a pressure is applied by a dynamic pressure generation portion to a portion of the lubricating oil 45 which is arranged in the upper seal gap 661, and a pressure which induces the lubricating oil 45 to flow downward is generated. This contributes to preventing the lubricating oil 45 from flowing upward out of the upper seal gap 661. The upper capillary seal portion 661a and the pumping action portion may be used in combination. This contributes to reducing the axial dimension of the upper capillary seal portion 661a as compared to the case where the liquid surface of the lubricating oil 45 is held by only the upper capillary seal portion 661a.

The inner circumferential surface of the lower hub tubular portion 54 is arranged radially opposite the inclined surface of the outer tubular portion 422. A gap 662 extending downward is preferably defined between the lower hub tubular portion 54 and the outer tubular portion 422. The gap 662 is arranged radially outward of the radial gap 62, the lower end gap 63, the cylindrical gap 64, the lower thrust gap 652, and the communicating hole 61. The gap 662 is arranged to gradually increase in width with decreasing height, that is, toward an opening of the gap 662. Hereinafter, the gap 662 will be referred to as a "lower seal gap 662". In addition, the lower seal gap 662 is arranged to be angled toward the central axis J1 with decreasing height. That is, the lower seal gap 662 is preferably angled to the left in FIG. 3. A liquid surface of the lubricating oil 45 is located in the lower seal gap 662. The lubricating oil 45 is held in the lower seal gap 662 through capillary action. A lower capillary seal portion 662a arranged to hold the lubricating oil 45 is preferably defined in the lower seal gap 662. Oil-repellent films 86 are preferably arranged on portions of the inner circumferential surface of the lower hub tubular portion 54 and the inclined surface of the outer tubular portion 422 which are located below the liquid surface in the lower seal gap 662. The same is true of other preferred embodiments described below. In the bearing mechanism 4, the communicating hole 61 is arranged to bring the upper seal gap 661 and the lower seal gap 662 into communication with each other.

In the bearing mechanism 4, the communicating hole 61 and a region ranging from the upper seal gap 661 to the lower seal gap 662 through the upper thrust gap 651, the radial gap 62, the lower end gap 63, the cylindrical gap 64, and the lower thrust gap 652 are continuously filled with the lubricating oil 45. When the bearing mechanism 4 is constructed, the lubricating oil 45 is preferably fed into the bearing mechanism 4 through the lower seal gap 662 with the lower seal gap 662 arranged to face upward in the direction of gravity. It is preferably possible to control the amount of the lubricating oil 45 by visually identifying the height of the liquid surface in the lower seal gap 662.

Note that the visual identification may be conducted either with eyes alone or with a magnified view of the lower seal gap 662 with the aid of a device such as a microscope. Also note that the visual identification may be conducted with a magnified image of the lower seal gap 662 shown on a screen with the aid of a device.

An upper thrust dynamic pressure groove array (not shown) is preferably defined in the lower surface of the annular portion 412 or the upper surface of the flange portion 52 in the upper thrust gap 651. The upper thrust dynamic pressure groove array preferably includes, for example, an array of grooves arranged in a spiral pattern or an array of grooves arranged in a herringbone pattern. When the motor 12 is running, the upper thrust dynamic pressure groove array induces a dynamic pressure on the lubricating fluid 45, and an upper thrust dynamic pressure bearing is defined in the upper thrust gap 651. Meanwhile, lower thrust dynamic pressure groove arrays (not shown) are preferably defined in the upper surface of the outer tubular portion 422 and the lower surface of the flange portion in the lower thrust gap 652. Each lower thrust dynamic pressure groove array includes, for example, an array of grooves arranged in a spiral pattern or an array of grooves arranged in a herringbone pattern. When the motor 12 is running, the lower thrust dynamic pressure groove arrays induce a dynamic pressure on the lubricating fluid 45, and a lower thrust dynamic pressure bearing is defined in the lower thrust gap 652. The rotating portion 3 is arranged to rotate while being supported axially by the upper thrust dynamic pressure bearing and the lower thrust dynamic pressure bearing.

A radial dynamic pressure groove array (not shown) is preferably defined in an inner circumferential surface of the sleeve portion 5 or the outer circumferential surface of the columnar portion 411 in the radial gap 62. The radial dynamic pressure groove array is preferably, for example, an array of grooves arranged in a herringbone pattern. When the motor 12 is running, the radial dynamic pressure groove array induces a dynamic pressure on the lubricating fluid 45, and a radial dynamic pressure bearing is defined in the radial gap 62. The rotating portion 3 is arranged to rotate while being supported radially by the radial dynamic pressure bearing. Note that the number of radial dynamic pressure bearings may be either one or more than one.

Figure 4:
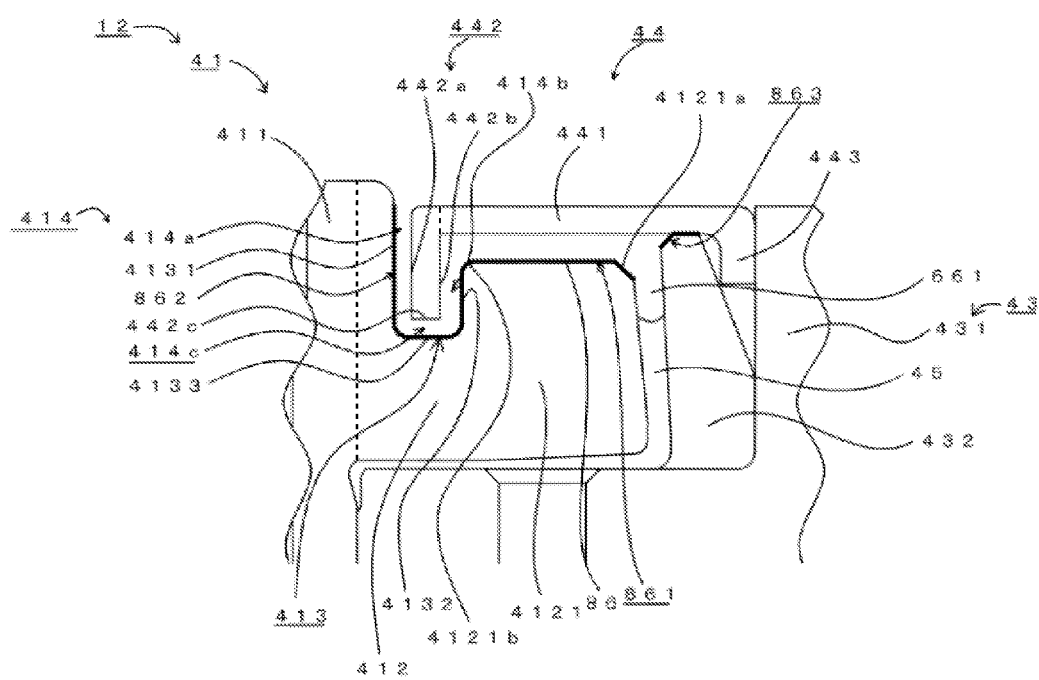
FIG. 4 is a vertical cross-sectional view of a shaft portion and its vicinity according to a preferred embodiment of the present invention.

FIG. 4 is a vertical cross-sectional view of the shaft portion 41 and its vicinity according to a preferred embodiment of the present invention. The shaft portion 41 preferably includes the recessed portion 413, which is annular and recessed downward. In the present preferably embodiment, the recessed portion 413 is preferably defined in the annular portion 412. The recessed portion 413 includes a first side surface 4131, which is an inner circumferential surface, a bottom surface 4133 arranged to extend radially outward from a lower end portion of the first side surface 4131, and a second side surface 4132 arranged to extend upward from an outer end portion of the bottom surface and arranged radially outside the first side surface 4131. Each of the first side surface 4131, the second side surface 4132, and the bottom surface 4133 is preferably an annular or a substantially annular surface. That is, each of the first side surface 4131, the second side surface 4132, and the bottom surface 4133 is defined by the annular portion 412. Provision of the recessed portion 413 in the shaft portion 41 enables the projecting portion 442 to be arranged close to the first side surface 4131. This contributes to preventing air including an evaporated portion of the lubricating oil 45 in the upper seal gap 661 from traveling out of the motor 12. The annular portion 412 is preferably arranged to have a sufficient thickness between the lower surface and each of an upper surface of the annular raised portion 4121 and the bottom surface 4133 of the recessed portion 413 to prevent a significant reduction in rigidity of the annular portion 412 despite presence of the recessed portion 413.

A lower end portion 442c of the projecting portion 442 of the cap portion 44 is arranged inside the recessed portion 413. The first side surface 4131 is preferably arranged opposite to an inner circumferential surface 442a of the projecting portion 442 with a first region 414a intervening therebetween. The first region 414a is preferably a region extending in an axial direction. The second side surface 4132 is arranged opposite to an outer circumferential surface 442b of the projecting portion 442 with a second region 414b intervening therebetween. The second region 414b is a region extending in the axial direction. The bottom portion 4133 of the recessed portion 413 is preferably arranged opposite to the lower end portion 442c of the projecting portion 442 with a third region 414c intervening therebetween. Note that the third region 414c is an entire region of the recessed portion 413 excluding the first region 414a and the second region 414b. The third region 414c is a region extending radially. The cap portion 44 including the projecting portion 442 leads to securing a sufficient axial dimension of the first region 414a, and also to securing a sufficient rigidity of the cap portion 44. In particular, the flexural strength of the cap portion 44 is improved, and this contributes to preventing the cap portion 44 from being deformed when the cap portion 44 is press fitted and fixed to the tubular projecting portion 431. Arrangement of the lower end portion 442c of the projecting portion 442 in the recessed portion 413 leads to an increased distance between the upper seal gap 661 and an outside of the motor 12, resulting in a reduction in evaporation of the lubricating oil 45.

The average distance between the first side surface 4131 and the inner circumferential surface 442a of the projecting portion 442 is preferably shorter than the average distance between the second side surface 4132 and the outer circumferential surface 442b of the projecting portion 442 and shorter than the average distance between the bottom portion 4133 of the recessed portion 413 and the lower end portion 442c of the projecting portion 442. That is, the average radial dimension of the first region 414a preferably is smaller than both the average radial dimension of the second region 414b and the average axial dimension of the third region 414c.

For example, the minimum radial width of the first region 414a is preferably in the range of about 0.03 mm to about 0.2 mm. Specifically, the minimum radial width of the first region 414a is more preferably in the range of about 0.03 mm to about 0.1 mm, for example. The minimum radial width of the second region is preferably in the range of about 0.04 mm to about 0.2 mm, for example. Specifically, the minimum radial width of the second region is more preferably in the range of about 0.05 mm to about 0.1 mm, for example.

The first region 414a is preferably connected with the upper seal gap 661 through the third region 414c, the second region 414b, and a gap between a lower surface of the flat plate portion 441 and an upper surface of the annular raised portion 4121. In the motor 12, a communicating channel 414 arranged to bring the upper seal gap 661 into communication with a space above the flat plate portion 441 is preferably defined by a combination of the first region 414a, the third region 414c, and the second region 414b. The presence of the first region 414a, the second region 414b, and the third region 414c in the communicating channel 414 contributes to preventing the air including the evaporated portion of the lubricating oil 45 in the upper seal gap 661 from traveling out of the motor 12. This results in a reduction in evaporation of the lubricating oil 45 and an improvement in the life of the motor 12.

Moreover, the lower end portion 442c of the projecting portion 442 is preferably arranged at an axial height lower than an axial height of the upper surface of the annular raised portion 4121. This leads to securing a sufficient axial dimension of each of the first region 414a and the second region 414b. Moreover, a relatively large length of the upper seal gap 661 is secured to ensure a large capacity of a lubricating oil reservoir in which the lubricating oil 45 can be held.

The axial position of the projecting portion 442 and the axial position of the liquid surface of the lubricating oil 45 in a stationary state are arranged to radially overlap with each other. Thus, a reduction in the axial thickness of the motor 12 is achieved as compared to the case where the axial position of the projecting portion 442 and the axial position of the liquid surface of the lubricating oil 45 in the stationary state do not radially overlap with each other.

The capacity of the entire region of the recessed portion 413 excluding the first region 414a and the second region 414b, i.e., the capacity of the third region 414c, is preferably larger than both the capacity of the first region 414a and the capacity of the second region 414b. In addition, the axial dimension of the first region is preferably greater than the axial dimension of the third region 414c.

Increasing the axial dimension of each of the first region 414a and the second region 414b contributes to improving an effect of reducing the evaporation of the lubricating oil 45. That is, the axial distance between the bottom portion 4133 of the recessed portion 413 and the lower end portion 442c of the projecting portion 442, which together define the third region 414c, is shortened. However, a short axial distance between the bottom portion 4133 of the recessed portion 413 and the lower end portion 442c of the projecting portion 442 accelerates a flow of air in the third region 414c, promoting the evaporation of the lubricating oil 45. Meanwhile, an excessively large axial dimension of the third region 414c results in a small axial dimension of each of the first region 414a and the second region 414b, significantly lessening an effect of reducing axial air passage therein. Accordingly, the capacity of the third region 414c is preferably larger than both the capacity of the first region 414a and the capacity of the second region 414b, and the axial dimension of the first region preferably is greater than the axial dimension of the third region 414c, to achieve a reduction in the evaporation of the lubricating oil 45 and an improvement in the life of the motor 12.

A portion of the second side surface 4132 and the upper surface of the annular raised portion 4121 preferably include an oil-repellent film portion on which an oil-repellent film 86 is arranged. In addition, a portion of the recessed portion 413 includes an oil-repellent film portion on which an oil-repellent film 86 is arranged. The upper surface of the annular raised portion 4121, a chamfer 4121a arranged at an outer end portion of the upper surface of the annular raised portion 4121, and a round surface 4121b arranged at an inner end portion of the upper surface of the annular raised portion 4121 preferably include a first oil-repellent film portion 861 on which the oil-repellent film 86 is arranged to extend over an entire circumferential extent thereof. Moreover, the recessed portion 413 preferably includes a second oil-repellent film portion 862 on which the oil-repellent film 86 is arranged to extend over an entire circumferential extent thereof. Note that the chamfer 4121a may alternatively be arranged to have a round shape. Also note that the round surface 4121b may alternatively be a chamfer.

It is enough that the first oil-repellent film portion 861 should be arranged at least in the upper surface of the annular raised portion 4121, and the first oil-repellent film portion 861 does not necessarily need to be arranged in all of the upper surface of the annular raised portion 4121, the chamfer 4121a, and the round surface 4121b. For example, only the upper surface of the annular raised portion 4121 may define the first oil-repellent film portion 861, or the upper surface of the annular raised portion 4121 and the chamfer 4121a may define the first oil-repellent film portion 861. Alternatively, the upper surface of the annular raised portion 4121 and the round surface 4121b may define the first oil-repellent film portion 861. Note that a portion of the first oil-repellent film portion 861 may be arranged in the outer circumferential surface of the annular raised portion 4121 axially below the chamfer 4121a.

It is enough that the second oil-repellent film portion 862 should be arranged at least in a portion of the second side surface 4132 and radially inside the second side surface 4132 in the recessed portion 413. For example, only the second side surface 4132 may define the second oil-repellent film portion 862, or the first side surface 4131, the bottom portion 4133 of the recessed portion 413, and the second side surface 4132 may define the second oil-repellent film portion 862. Alternatively, only the first side surface 4131 and the second side surface 4132 may define the second oil-repellent film portions 862, or the entire second side surface 4132 may define the second oil-repellent film portion 862. Note that a region of the first side surface 4131 on which the oil-repellent film 86 is arranged is a region opposed to the inner circumferential surface 442a of the projecting portion 442.

A strong shock to the motor 12 may cause droplets of the lubricating oil 45 in the upper seal gap 661 to be scattered, so that some of the droplets may be adhered to a lower surface of the cap portion 44 or the upper surface of the annular portion raised portion 4121. Accordingly, the first oil-repellent film portion 861 and the second oil-repellent film portion 862 are arranged in the motor 12 to contribute to preventing the droplets of the lubricating oil 45 from traveling radially inward on the lower surface of the cap portion 44 or the upper surface of the annular raised portion 4121. The lubricating oil 45 is thus prevented from leaking out of the motor 12. In other words, the lubricating oil 45 is prevented from traveling radially inward beyond the first oil-repellent film portion 861 and the second oil-repellent film portion 862. Moreover, the provision of the first oil-repellent film portion 861 contributes to more effective prevention of a leakage of the lubricating oil 45 out of the upper seal gap 661. Furthermore, because the gap between the lower surface of the cap portion 44 and the upper surface of the annular raised portion 4121 is a minute gap, the first oil-repellent film portion 861 reduces the leakage of the lubricating oil 45 out of the upper seal gap 661.

A region of the inner circumferential surface of the upper tubular portion 432 which extends from a position above the liquid surface of the lubricating oil 45 to an upper surface of the upper tubular portion 432 of the tubular portion 43 preferably includes a third oil-repellent film portion 863 on which an oil-repellent film 86 is arranged to extend over an entire circumferential extent thereof. Note that the third oil-repellent film portion 863 may be arranged only in the upper surface of the upper tubular portion 432, or may alternatively be arranged in the entire region extending from the position above the liquid surface of the lubricating oil 45 to the upper surface of the upper tubular portion 432.

A strong shock to the motor 12 may cause droplets of the lubricating oil 45 in the upper seal gap 661 to be scattered, so that some of the droplets may be adhered to the upper surface of the upper tubular portion 432. The third oil-repellent film portion 863 is arranged in the motor 12 to contribute to preventing the droplets of the lubricating oil 45 from traveling radially outward beyond the upper surface of the upper tubular portion 432 because of the shock or the like. The lubricating oil 45 is thus prevented from leaking out of the motor 12.

An outer circumferential surface of the bent portion 443 of the cap portion 44 is preferably press fitted and thus fixed to the inner circumferential surface of the tubular projecting portion 431 of the tubular portion 43. Thus, the cap portion 44 is fixed with increased stability. Note that the bent portion 443 may be fixed to the tubular projecting portion 431 through an adhesive. Also note that both press fitting and the adhesive may be used if so desired. The area of contact between the bent portion 443 and the tubular projecting portion 431 is thus increased. This results in an improvement in strength of the press fitting. Note that, in the case where the bent portion 443 and the tubular projecting portion 431 are fixed to each other through the adhesive, an improvement in adhesive strength is achieved.

The lower surface of the flat plate portion 441 is preferably arranged to be in vertical contact with the upper surface of the upper tubular portion 432. This leads to a further improvement in accuracy of the fitting of the cap portion 44, leading to precisely defining the first region 414a, the second region 414b, and the third region 414c.

The bent portion 443 of the cap portion 44 preferably has a radial width greater than the radial width of the projecting portion 442. This results in improved rigidity of the cap portion 44, and even in the case where the outer circumferential surface of the bent portion 443 and the inner circumferential surface of the tubular projecting portion 431 are fixed to each other through press fitting, each of the first region 414a, the second region 414b, and the third region 414c is defined precisely.

Axial extension of the bent portion 443 of the cap portion 44 is preferably enabled by the tubular projecting portion 431 and the upper tubular portion 432 being defined by separate members. This leads to an increased distance over which the bent portion 443 and the tubular projecting portion 431 are fastened to each other, enabling the cap portion 44 to be fixed stably.

Figure 5:
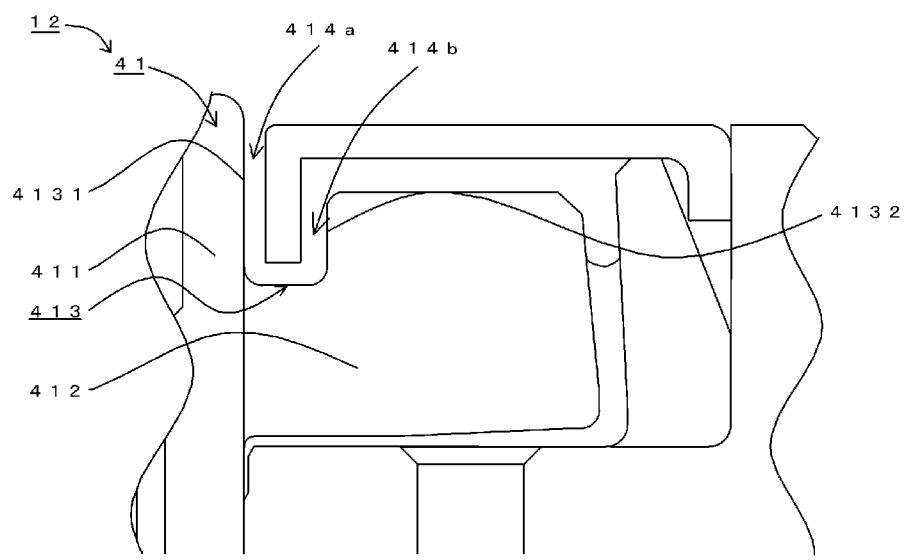
FIG. 5 is a vertical cross-sectional view of a shaft portion and its vicinity according to an example modification of a preferred embodiment of the present invention.

FIG. 5 is a vertical cross-sectional view of a shaft portion 41 and its vicinity according to an example modification of a preferred embodiment of the present invention. In the example modification, a recessed portion 413 is arranged to extend over a columnar portion 411 and an annular portion 412. In a motor 12, a first side surface 4131 is defined in an outer circumferential surface of the columnar portion 411. In the example modification, the outside diameter of the columnar portion 411 is arranged to be equal or substantially equal to the outside diameter of the first side surface 4131. In addition, the columnar portion 411 and the annular portion 412 are defined by separate members. The motor 12 is otherwise substantially similar in structure to the motor 12 according to the above-described preferred embodiment. The above arrangements enable a first region 414a and a second region 414b to be positioned more radially inward than in the case where the first side surface 4131 and a second side surface 4132 are defined by the annular portion 412. Accordingly, a reduction in evaporation of a lubricating oil 45 is achieved, leading to an improved life of the motor 12. Note that, in this example modification, the columnar portion 411 and the annular portion 412 may be defined by a single member.

Figure 6:
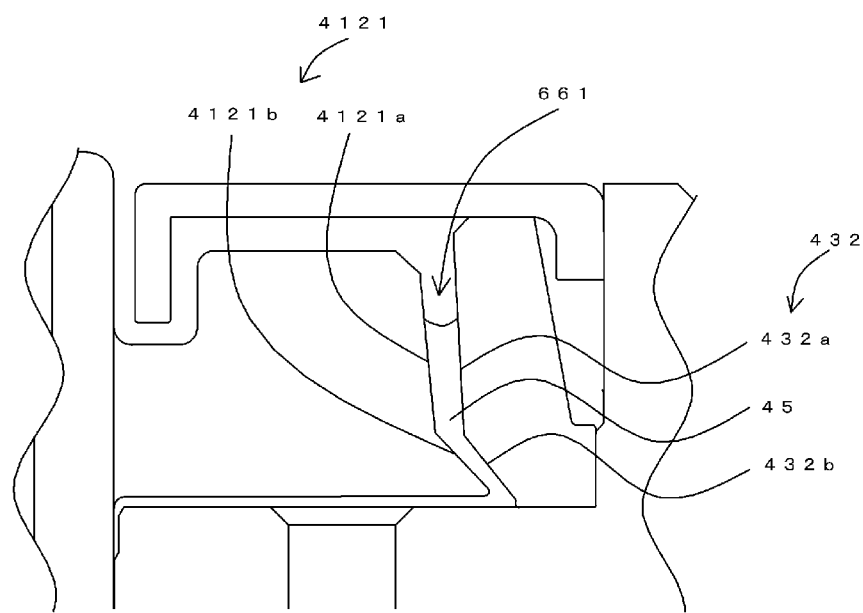
FIG. 6 is a vertical cross-sectional view of a shaft portion and its vicinity according to another example modification of a preferred embodiment of the present invention.

FIG. 6 is a vertical cross-sectional view of a shaft portion 41 and its vicinity according to another example modification of a preferred embodiment of the present invention. An outer circumferential surface of an annular raised portion 4121 preferably includes a first outer circumferential surface 4121a and a second outer circumferential surface 4121b arranged axially below the first outer circumferential surface 4121a. An inner circumferential surface of an upper tubular portion 432 includes a first inner circumferential surface 432a arranged opposite to the first outer circumferential surface 4121a with an upper seal gap 661 intervening therebetween, and a second inner circumferential surface 432b arranged axially below the first inner circumferential surface 432a and opposite to the second outer circumferential surface 4121b with the upper seal gap 661 intervening therebetween. This makes it possible to secure a relatively large length of the upper seal gap 661 to ensure a large capacity of a lubricating oil reservoir in which a lubricating oil 45 can be held.

Figure 7:
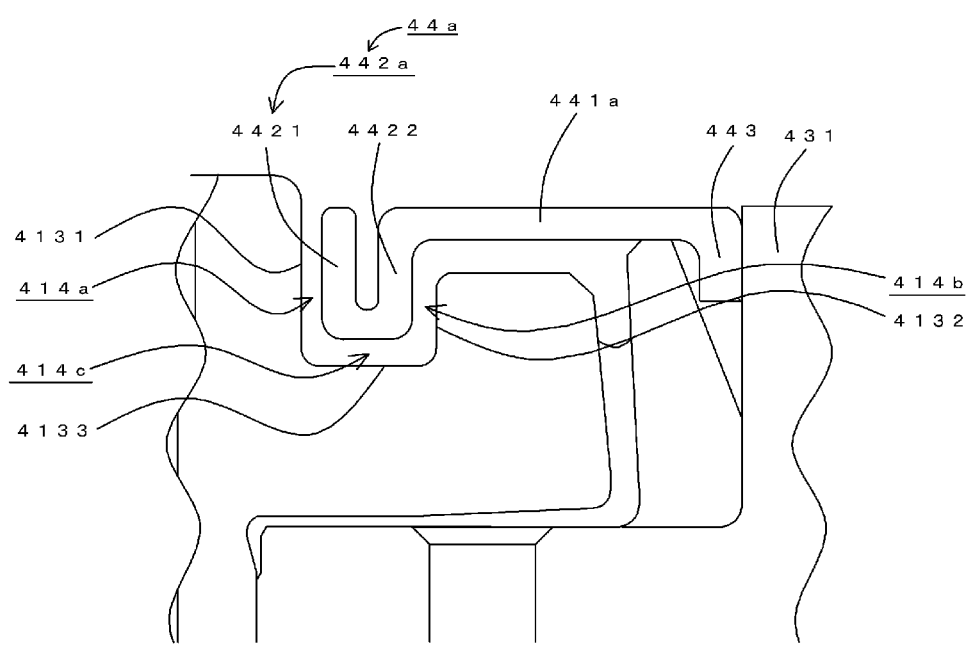
FIG. 7 is a vertical cross-sectional view of a shaft portion and its vicinity according to yet another example modification of a preferred embodiment of the present invention.

FIG. 7 is a vertical cross-sectional view of a shaft portion 41 and its vicinity according to yet another example modification of a preferred embodiment of the present invention. A projecting portion 442a of a cap portion 44a preferably includes a first projecting portion 4422 arranged to project downward from a radially outer end of a flat plate portion 441a, and a second projecting portion 4421 arranged radially inward of the first projecting portion 4422. A first side surface 4131 is preferably arranged opposite to an inner circumferential surface of the second projecting portion 4421 with a first region 414a intervening therebetween. A second side surface 4132 is preferably arranged opposite to an outer circumferential surface of the first projecting portion 4422 with a second region 414b intervening therebetween. A bottom portion 4133 of a recessed portion 413 is arranged opposite to a lower end portion of the projecting portion 442a with a third region 414c intervening therebetween. Thus, the rigidity of the cap portion 44a is improved, and therefore, even in the case where an outer circumferential surface of a bent portion 443 and an inner circumferential surface of a tubular projecting portion 431 are fixed to each other through press fitting, each of the first region 414a, the second region 414b, and the third region 414c is precisely defined.

The bent portion 443 of the cap portion 44 according to the present preferred embodiment may be arranged to project upward radially outside the flat plate portion 441. In this case, the outer circumferential surface of the bent portion 443 is fixed to the inner circumferential surface of the tubular projecting portion 431 in a tight-fit condition. The bent portion 443 is arranged to lead to an increased area of contact between the cap portion 44 and the tubular projecting portion 431. This results in an improvement in strength of the press fitting. Note that, in the case where the bent portion 443 and the tubular projecting portion 431 are fixed to each other through the adhesive, an improvement in adhesive strength is achieved.

Note that, although the upper thrust dynamic pressure bearing, the lower thrust dynamic pressure bearing, and the radial dynamic pressure bearing are used in the motor, this is not essential to preferred embodiments of the present invention. For example, in place of the upper thrust dynamic pressure bearing, the lower thrust dynamic pressure bearing, and the radial dynamic pressure bearing, a conical dynamic pressure bearing may be used in the motor.

Features of the above-described preferred embodiments and the example modifications thereof may be combined appropriately as long as no conflict arises.

The preferred embodiments of the present invention and modifications thereof are applicable to spindle motors and disk drive apparatuses.

Features of the above-described preferred embodiments and the modifications thereof may be combined appropriately as long as no conflict arises.

While preferred embodiments of the present invention and modifications thereof have been described above, it is to be understood that variations and modifications will be apparent to those skilled in the art without departing from the scope and spirit of the present invention. The scope of the present invention, therefore, is to be determined solely by the following claims.

What is claimed is:

1. A spindle motor comprising:
   a stationary portion including a shaft portion; and
   a rotating portion including a rotor magnet, and rotatably supported by the stationary portion through a lubricating oil; wherein
   the shaft portion includes:
      a columnar portion arranged along a central axis and extending in a vertical direction;
      an annular portion arranged to extend radially outward from the columnar portion; and
      an annular recessed portion arranged to be recessed downward;
   the rotating portion includes:
      a sleeve portion arranged opposite to the shaft portion;
      a tubular portion arranged to extend upward from a position radially outward of a gap between the shaft portion and the sleeve portion, and arranged opposite to the shaft portion; and
      a cap portion arranged near a top portion of the tubular portion;
   the cap portion includes:
      a flat plate portion arranged to extend radially; and
      a projecting portion arranged radially inside the flat plate portion, and arranged to project downward from the flat plate portion;
   the lubricating oil is arranged in the gap between the shaft portion and the sleeve portion, the gap is arranged to be in communication with an upper seal portion defined between the annular portion and the tubular portion, and a liquid surface of the lubricating oil is located in the upper seal portion;
   the recessed portion includes a first side surface and a second side surface arranged radially outside the first side surface;
   a lower end portion of the projecting portion is arranged inside the recessed portion;
   the first side surface is arranged opposite to an inner circumferential surface of the projecting portion with a first region intervening therebetween;
   the second side surface is arranged opposite to an outer circumferential surface of the projecting portion with a second region intervening therebetween;
   a bottom portion of the recessed portion is arranged opposite to the lower end portion of the projecting portion with a third region intervening therebetween; and
   an average distance between the first side surface and the inner circumferential surface of the projecting portion is shorter than an average distance between the second side surface and the outer circumferential surface of the projecting portion and shorter than an average distance between the bottom portion of the recessed portion and the lower end portion of the projecting portion.

2. The spindle motor according to claim 1, wherein the annular portion includes an annular raised portion arranged radially outward of the recessed portion, and the lower end portion of the projecting portion is arranged at an axial height lower than an axial height of an upper surface of the annular raised portion.

3. The spindle motor according to claim 2, wherein a portion of the second side surface and the upper surface of the annular raised portion include an oil-repellent film portion on which an oil-repellent film is arranged.

4. The spindle motor according to claim 2, wherein the tubular portion includes an upper tubular portion including an inner circumferential surface arranged opposite to an outer circumferential surface of the annular raised portion.

5. The spindle motor according to claim 4, wherein an upper end surface of the upper tubular portion is arranged to be in contact with a lower surface of the flat plate portion of the cap portion.

6. The spindle motor according to claim 1, wherein the recessed portion is defined in the annular portion.

7. The spindle motor according to claim 1, wherein
the recessed portion extends over the columnar portion and the annular portion; and
the first side surface is a portion of an outer circumferential surface of the columnar portion.

8. The spindle motor according to claim 1, wherein an axial position of the projecting portion and an axial position of the liquid surface of the lubricating oil in a stationary state radially overlap with each other.

9. The spindle motor according to claim 1, wherein a capacity of the third region is larger than both a capacity of the first region and a capacity of the second region.

10. The spindle motor according to claim 1, wherein the columnar portion and the annular portion are defined by separate members.

11. The spindle motor according to claim 1, wherein the columnar portion and the annular portion are defined by a single monolithic member.

12. The spindle motor according to claim 1, wherein a portion of the recessed portion includes an oil-repellent film portion on which an oil-repellent film is arranged.

13. The spindle motor according to claim 1, wherein a radial gap of the upper seal portion gradually increases with increasing height.

14. The spindle motor according to claim 1, wherein at least one of an outer circumferential surface of the annular portion and an inner circumferential surface of the tubular portion, which together define the upper seal portion, includes a groove array arranged to induce an axially downward pressure on the lubricating oil.

15. The spindle motor according to claim 1, wherein the cap portion includes a bent portion arranged radially outside the flat plate portion and arranged to project upward or downward.

16. The spindle motor according to claim 15, wherein an outer circumferential surface of the bent portion is fixed to an inner circumferential surface of the tubular portion through press fitting.

17. The spindle motor according to claim 16, wherein the bent portion has a radial width greater than a radial width of the projecting portion.

18. A disk drive apparatus comprising:
the spindle motor of claim 1 arranged to rotate a disk;
an access portion arranged to perform at least one of reading and writing of information from or to the disk; and
a housing arranged to contain the disk, the spindle motor, and the access portion.

* * * * *